United States Patent [19]

Stephenson

[11] Patent Number: 5,140,340
[45] Date of Patent: Aug. 18, 1992

[54] APPARATUS AND METHOD FOR PRINTING OF IMAGES WITH COMPENSATION FOR DISLOCATION OF PRINTING MEDIA

[75] Inventor: Stanley W. Stephenson, Spencerport, N.Y.

[73] Assignee: Eastman Kodak Company, Rochester, N.Y.

[21] Appl. No.: 647,890

[22] Filed: Jan. 30, 1991

[51] Int. Cl.⁵ ............................................. G01D 9/00
[52] U.S. Cl. .................................. 346/1.1; 346/136; 346/76 PH
[58] Field of Search ................... 346/76 PH, 1.1, 136; 271/227, 265

[56] References Cited

U.S. PATENT DOCUMENTS

| | | | |
|---|---|---|---|
| 3,783,293 | 1/1974 | Gold et al. | 250/548 |
| 4,374,385 | 2/1983 | Yoshizaki et al. | 346/1.1 |
| 4,478,405 | 10/1984 | Eertink et al. | 271/227 |
| 4,614,950 | 9/1986 | Ito | 346/76 PH |
| 4,647,234 | 3/1987 | Isobe | 400/120 |
| 4,667,208 | 5/1987 | Shiraki et al. | 346/76 PH |
| 4,727,437 | 2/1988 | Mizoguchi | 358/304 |
| 4,734,868 | 3/1988 | DeLacy | 364/519 |
| 4,751,519 | 6/1988 | Shimada et al. | 346/76 PH |
| 4,839,674 | 6/1989 | Hanagata et al. | 346/136 |
| 4,925,325 | 5/1990 | Niikawa | 400/582 |

FOREIGN PATENT DOCUMENTS

| | | |
|---|---|---|
| 224976 | 9/1988 | Japan . |
| 308270 | 12/1990 | Japan . |
| 2217833 | 11/1989 | United Kingdom . |

*Primary Examiner*—Mark J. Reinhart
*Assistant Examiner*—Huan Tran
*Attorney, Agent, or Firm*—Raymond L. Owens

[57] ABSTRACT

A printing machine includes a print head and a set of sensors adapted to accurately determine the relative position between the print head and a receiver (print media) onto which an image is to be formed. Any dislocation of the receiver from a predetermined nominal position is translated by a data conditioner into correction signals. These correction signals are integrated with nominal incoming image data directed to the print head. The print head then prints an image that compensates for positional variation of the receiver so that a resultant image is properly aligned with the receiver.

17 Claims, 6 Drawing Sheets

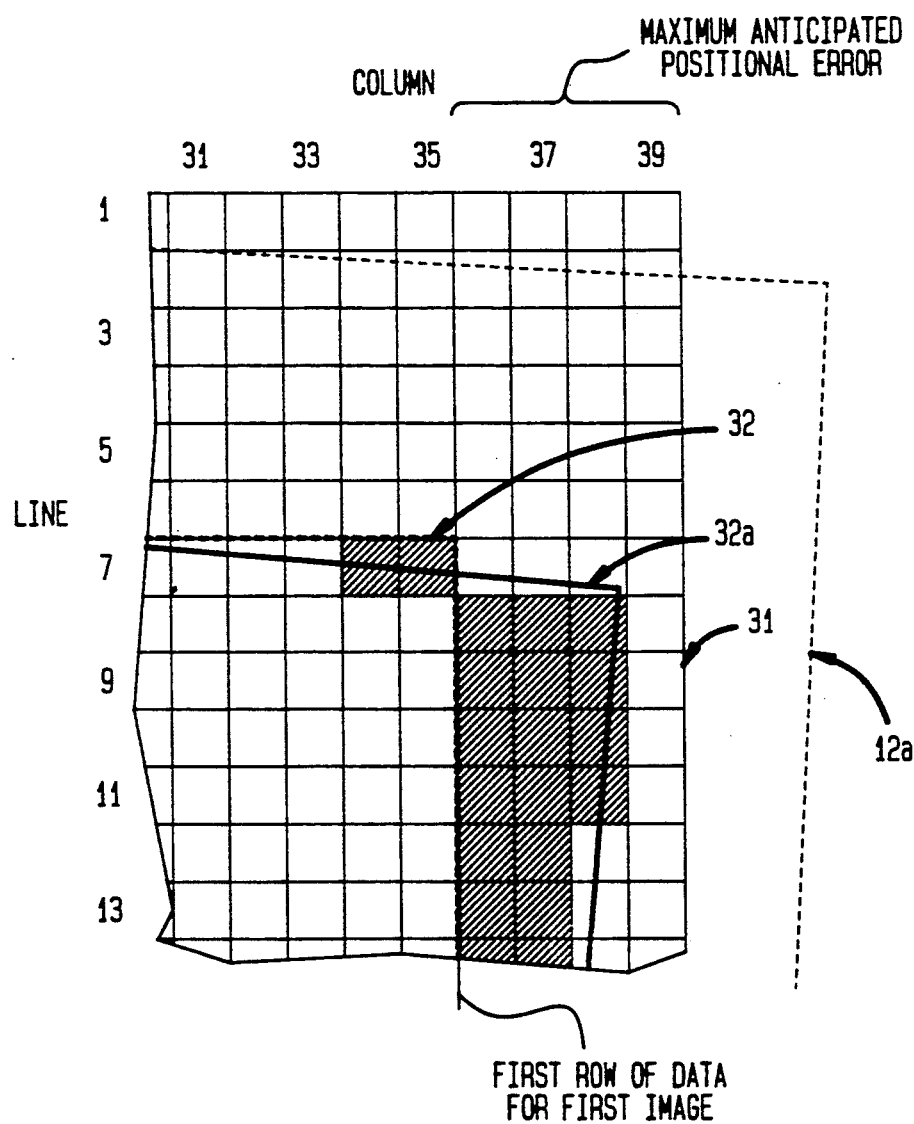

APPARATUS AND METHOD FOR PRINTING OF IMAGES WITH COMPENSATION FOR DISLOCATION OF PRINTING MEDIA

FIELD OF THE INVENTION

This invention relates generally to printing images on receivers of various media with a print head, and more particularly, to improving image quality by compensating for dislocation of the receivers.

BACKGROUND OF THE INVENTION

The field of computer generated imaging has evolved to include techniques for printing full-color images on various receivers (e.g., print media such as paper and transparent films). Various types of data directed or programmable printing machines (e.g., thermal printers and laser printers) have been devised to accomplish this full-color printing. One characteristic which many of these machines have in common is that a color image is made by three successive printing steps which involve the deposition of three printing colors on top of each other. For example, in the case of thermal printers, the colors are yellow, cyan and magenta.

An inherent difficulty in any multi-stage full-color printing is color-registration. In a typical full-color printing operation, a first primary color image is applied to the receiver. Then second and third primary color images are applied to the receiver. Typically the receiver is moved back and forth as each color is applied. In many instances the receiver does not return to precisely the same position under a print head after each back and forth movement. This dislocation of the receiver results in a misregistration of the three primary color images. Misregistration of the three images is discernable to a viewer as a defect.

A great deal of attention and effort has been applied to the problem of achieving accurate color registration in printing. Many elaborate systems have been created to carefully control the position of the receiver within a printer.

In one known technique, detectors are employed to determine if the receiver is properly positioned. To correct a positioning error, various devices have been used to move the receiver into a desired location under a print head of a printer. Printers which have receiver-position correction features are typically quite complex, expensive to build and difficult to maintain. As a result, printers with these features are typically found only in large scale printing operations such as the printing of magazines, or other high volume commercial items.

Another known technique for controlling color registration utilizes lock-clamping of the receiver to a transport device, such as a roller platen. When the receiver is locked on a platen, its position through successive printing steps is more predictable. These types of lock-clamping devices introduce undesirable complexities to the operation of printers. For example, the steps of clamping and unclamping print receiver often requires a printing operation to stop and start. This increases print cycle time.

Printers that generate full-color images from computerized data are particularly desirable when used in conjunction with relatively small personal computers. One ideal application for a machine such as a full-color thermal printer or laser printer is in an office or laboratory setting where office workers operate the printers. In this setting it is desirable that the printers be small, inexpensive and easy to maintain. Prior art techniques for controlling color registration, lock-clamping and re-positioning of receivers, add substantially to the cost of these printers. In many cases printers employing such prior art techniques are not practical in an office or laboratory application because of high cost, low speed, or lack of simplicity.

It is desirable to have a relatively simple full-color printing system which provides accurate alignment of colors on a receiver at relatively low cost and high speed.

SUMMARY OF THE INVENTION

The present invention is directed to a printer and a method for operating same. The printer comprises a print head and transporting device for transporting a receiver sheet of printing media across the print head. Dislocations of the receiver which occur during its transport in the printer are measured prior to the beginning of printing of an image on the receiver. A data conditioner responds to the measurements and generates correction signals which are sent to the print head and are combined there with image data such that a printed image on the receiver aligns properly with a desired portion of the receiver irrespective of the location of the receiver.

In a preferred embodiment, the present invention is directed to a full color printing system and a method for operating same. The system comprises a dye-transferring print head and a transporting device for transporting a receiver sheet of printing media across the print head. In a series of successive passes the print head deposits a series of overlying primary color images on the receiver to create a full color image. Dislocations of the receiver which occur during the successive passes are measured prior to the beginning of printing of each primary color. A data conditioner responds to the measurements and generates correction signals which combine in the print head with image data sent to the print head such that a printed primary color image aligns with a preceding printed primary color image irrespective of the location of the receiver.

In the preferred embodiment the dislocations of the receiver are measured by a linear optical sensor which is activated in response to a trigger sensor whenever the receiver is advanced to a predetermined position within the printing apparatus.

Viewed from one aspect, the invention is directed to an apparatus, comprising a print head, for printing at least one image on a receiver. The apparatus comprises a position sensing means for determining the position of the receiver relative to a nominal position of the receiver and an image-position adjusting means responsive to a signal from the position sensing means and coupled to the print head for generating a correction signal which contains information as to the difference between the nominal position and the determined position of the receiver such that the image is formed on the receiver on a desired portion thereof independent of the position of the receiver.

Viewed from another aspect, the present invention is directed to an apparatus for printing two or more overlying images on a receiver. The apparatus comprises a print head adapted to print a first image onto the receiver, a position sensing means for determining the position of the receiver, and an image-position adjusting means responsive to the position sensing means for generating a correction signal which is coupled to the print head and which facilitates the print head printing a second image which is aligned with the first image on the receive independent of the position of the receiver relative to the print head.

Viewed from still another aspect, the present invention is directed to a method for printing an image onto a receiver which is transportable across a print head. The method comprises the steps of determining the position of the receiver relative to the position of the print head, comparing the determined position of the print head to a nominal position of the receiver, generating a correction signal which comprises information as to the difference between the nominal position of the receiver and an actual position of the receiver, and providing the correction signal to the print head such that the position of the image generated by the print head on the receiver is located on a desired portion of the receiver.

Viewed from yet another aspect, the present invention is directed to a method of using a print head to print at least one image on a receiver. The method comprises the steps of transporting the receiver to the print head, determining the position of the receiver relative to a nominal position, generating a correction signal which contains information as to the difference between the nominal position and the determined position, coupling the correction signal to the print head, and printing an image on the receiver on a desired portion thereof independent of the position of the receiver.

Viewed from still another aspect, the present invention is directed to a method of using a print head to print at least two images on a receiver. The method comprises the steps of transporting the receiver to the print head, determining the position of the receiver relative to the print head, printing a first image on the receiver while moving the receiver past the print head, again transporting the receiver to the print head, again determining the position of the receiver relative to the print head, generating a correction signal which contains information as to the difference between the determined positions of the receiver, providing the correction signal to the print head, and printing a second image on the receiver such that the second image is aligned to the first image.

The invention will be better understood from the following detailed description taken in consideration with the accompanying drawings and claims.

DETAILED DESCRIPTION OF THE DRAWINGS

FIG. 6 is a symbolic representation of a pattern of data needed to create a buffer zone to accommodate desired image-data correction in the sides of the data field of FIG. 3.

The drawings are not necessarily to scale.

DETAILED DESCRIPTION

Figure 1:
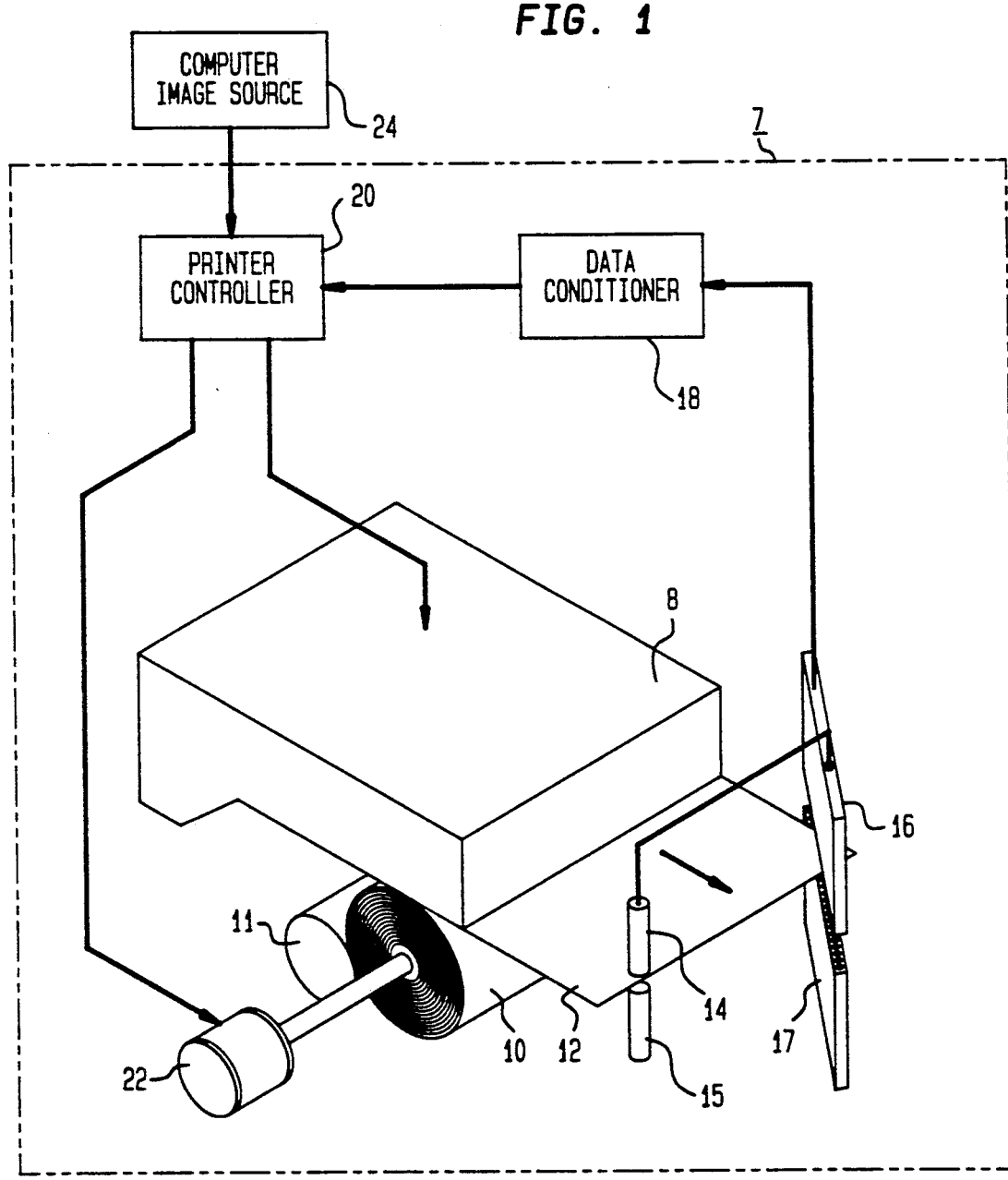
FIG. 1 is a schematic view of a thermal printer apparatus in accordance with the present invention.

Referring now to FIG. 1, there is shown a schematic representation of a full-color (typically a three color) thermal printing apparatus 7 (shown within a dashed line rectangle and hereinafter referred to as a printer 7) in accordance with the present invention. Elements of the printer 7 which are relevant to an understanding of the invention comprise a print head 8, a transport platen 10 and clamping roller 11 for transporting a receiver (printing media) 12, a trigger sensor 14 and an associated light source 15, a position sensor 16 and an associated light source 17, a data conditioner 18, a printer controller 20, and a stepper motor 22.

A computer image source 24 is coupled by an output thereof to a first input of the printer controller 20. The printer controller 20 is coupled by first and second outputs to the stepper motor 22 and to the print head 8, respectively. The stepper motor 22 rotates the platen 10 to advance the receiver 12. The trigger sensor 14 is adapted to detect the presence of the receiver 12 at a predetermined position and to signal the position sensor 16 to take a position reading of the receiver 12 at two edges thereof. The position sensor 16 is coupled to transmit receiver position information to the data conditioner 18. The data conditioner 18 is shown in FIG. 1 symbolically as a separate unit. However, in a preferred embodiment, the functions of the data conditioner 18 are performed in the printer controller 20 with a software sub-routine.

In operation the printer 7 functions under the direction of the printer controller 20. The printer controller 20 is a typically a microprocessor-based control system of the type describe in U.S. Pat. Nos. 4,745,413 (Scott Brownstein et al.) and 4,710,783 (Holden Caine et al.) which are incorporated herein be reference. The printer controller 20 is adapted to receive an image signal from the computer image source 24 that is typically a conventional computer adapted to transmit image data from its output. The printer controller 20 generates instructions for the stepper motor 22 and the print head 8 in response to image data received from the computer image source 24. Additionally, the printer controller 20 receives signals from various conventional detectors (not shown) in the printer 7 which provide routine administrative information such as, the presence of paper, the presence of a dye donor, and the beginning and end of a print cycle, etc.

In a typical print cycle, the printer controller 20 first directs the stepper motor 22 to advance the receiver 12 to a position-sensing location. This position-sensing location is illustrated in FIG. 1 in an exaggerated manner for purposes of clarity. The position-sensing location is determined as a point where the trigger sensor 14 senses a blocking of light from the light source 15 by presence of a leading edge of the receiver 12. At the moment in time when the receiver 12 reaches this position, the position sensor 16 determines the position of the two edges of the receiver 12 and establishes this position as a nominal reference location for the receiver 12. After the nominal reference location has been determined, the stepper motor 22 advances the receiver 12 a predetermined number of steps beyond the position-sensing location and then a first line of printing begins. The printing takes place on a line-by-line basis with the stepper motor 22 advancing the receiver 12 a predetermined incremental distance between successive lines of printing.

The print head 8 performs the printing operation by heating and selectively depositing spots of dye from a donor sheet (not shown) onto the receiver 12. This system of dye deposition thermal printing is well known in the prior art and is described in detail in the previously mentioned U.S. Pat. Nos. 4,710,783 and 4,745,413. The creation of a full color image requires the deposition of three separate images superimposed on each other, using yellow, cyan and magenta dyes successively.

The stepper motor 22 incrementally advances the transport platen 10 (also denoted as a transporting means) in a clockwise direction throughout the creation of a first color image on the receiver 12. At the completion of the first color image, the stepper motor 22 reverses and rotates the transport platen 10 in a counterclockwise direction until the leading edge of the receiver 12 has been withdrawn beyond the trigger sensor 14. The stepper motor 22 is then driven in the forward or clockwise direction until the trigger sensor 14 senses the leading edge of the receiver 12. At this point, the position sensor 16 once again determines the position of the edges of the receiver 12. It is important to operate the position sensor 16 only after a forward motion of the receiver 12. This minimizes any positioning errors produced by gear backlash in a drive train of the stepper motor 22 and platen 10.

The transport platen 10 then advances the receiver 12 to a position where printing of a second color image is to begin. This forward movement may be greater or less than the predetermined number of steps used to establish the beginning point for the first color image. The reason for this possible difference is explained later hereinbelow.

The printing process is repeated for a second color image and then for a third color image. At the completion of the printing of the three separate images, a full-color composite image has been produced on the receiver 12.

As the receiver 12 is repeatedly moved to and from the position-sensing location, there is a great likelihood that the receiver 12 will shift in location (position) relative to the transport platen 10 and the print head 8. In a typical thermal printer the transport platen 10 is an elastomer covered roller and the receiver 12 is held to the surface of the platen 10 by the clamping roller 11. This receiver transporting system is desirably simple and economical, and permits rapid print cycles. However, it suffers from the disadvantage that the receiver 12 may become dislocated during the print cycle. The amount of dislocation can be minimized by assuring that clamping roller 11 and the transport platen 10 are accurately shaped and operate in a smooth and precise manner. Nevertheless, very slight dislocations of the receiver 12 still occur. These dislocations, left uncorrected, result in a discernable mis-registration of the separate color images on the receiver 12. In the context of high resolution thermal printing (i.e., 150 lines per inch or greater), this results in a final image that has misaligned colors discernable to one viewing the image.

The printer 7 uses the position sensor 16 (also denoted as a position sensing and determining means) to sense dislocations which occur during the transporting of the receiver 12. When the receiver 12 reaches the position-sensing location for the second and third time in a print cycle, the position sensor 16 is activated by a signal from the trigger sensor 14 to accurately measure the position of the receiver 12 relative to the nominal position of the receiver which was determined when the receiver reached the position-sensing location the first time. Any dislocations from the nominal location of the receiver 12 are detected by the sensor 16 and are transmitted to the data conditioner 18. The data conditioner 18 then generates correction signals which are used to compensate for the detected dislocations. The printer controller 20 receives the correction signals and integrates them with the image data being received from the computer image source 24. Image data, including position information, is then sent to the print head 8 in a pattern that corrects for the detected dislocations. The print head 8 is thus able to generate an image in exactly the desired location on the receiver 12 even though the receiver 12 is not at its prior position on the transport platen 10.

The data conditioner 18 and the printer controller 20 act together to perform an image-position adjusting function. Accordingly, that combination of elements is denoted as an image-position adjusting means in the context of describing the present invention.

As described above, a nominal position is determined for each one of the receivers 20 when it is positioned in the printer 7 to form a first-color image. This receiver-specific nominal position is used as a reference to align all other overlying images subsequently formed on that particular receiver. It is also possible to practice the present invention by programming the printer 7 with a nominal receiver position which remains constant from one receiver to the next, i.e., a printer-specific nominal position. In other words, there are various techniques that can be used to produce a predetermined nominal position of the receiver.

Thus another aspect of the invention is the capability to form even a first image on the receiver 20 in a specific relationship to the receiver 20 independent of the position of the receiver 20 relative to the printer 7. This mode of operation is particularly useful when it is desired to maintain a precisely shaped border around an image on the receiver 20 or when printing on receivers which contain some pre-printed format information, e.g., letterheads or pre-printed forms. When a printer-specific nominal receiver position is programmed into the printer 7, the invention is useful for printing a monochromatic image on the receiver 20.

Figure 2:
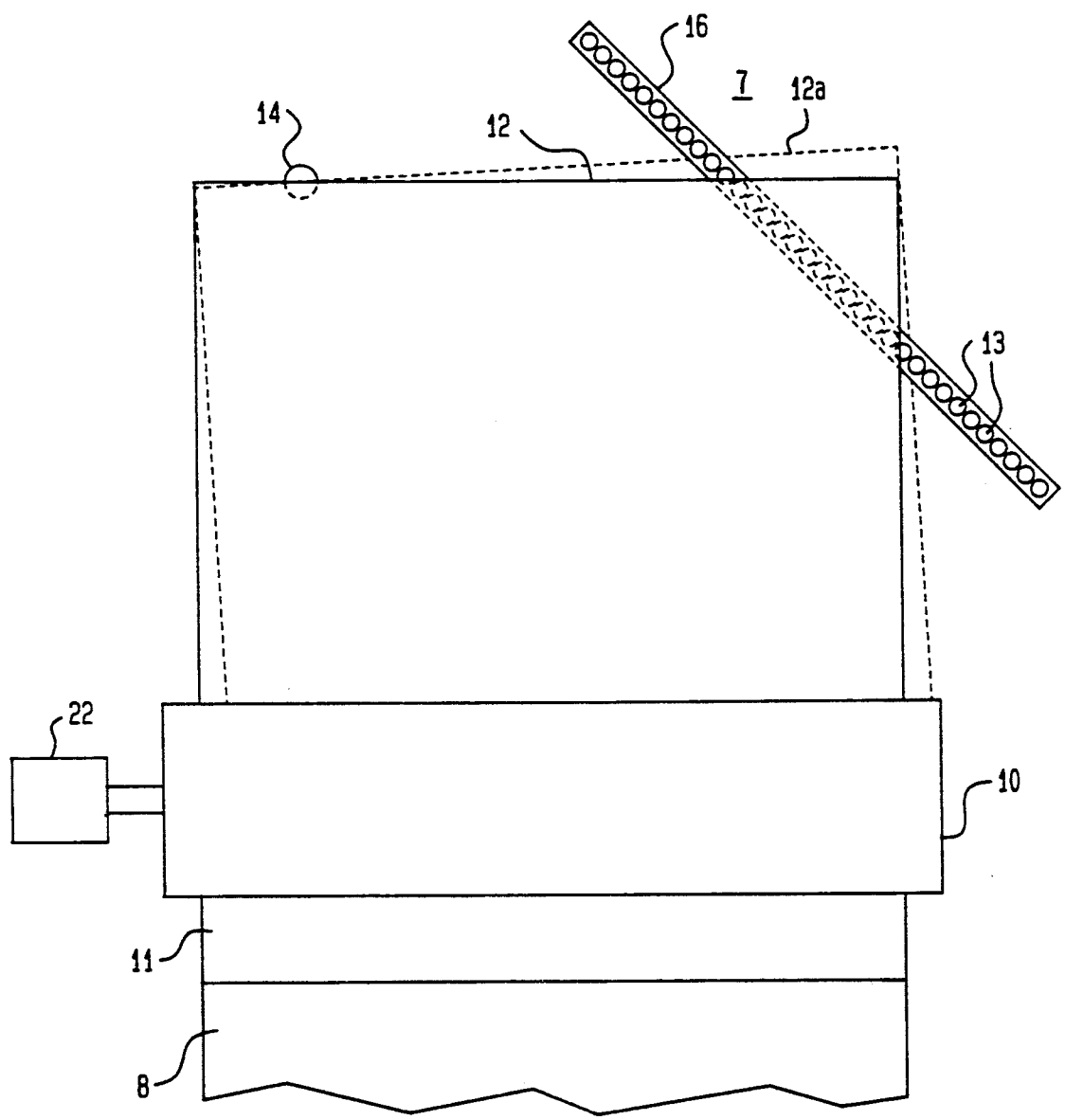
FIG. 2 is a bottom view of a portion of the thermal printer apparatus of FIG. 1.

Referring now to FIG. 2, there is illustrated a partial bottom view of the printer 7 with the light sources 15 and 17, the printer controller 20 and the data conditioner 18 removed for purposes of clarity. In a preferred embodiment, the sensor 16 is a Toshiba TCD104 CCD Linear Image Sensor coupled with a Selfoc Lens Array available from NSG America, Inc. The Selfoc Lens Array focuses the leading edge of the receiver 12 onto the Linear Image Sensor. In the preferred embodiment the light source is a diffused light red LED and the sensor 16 consists of an array of 128 sensing elements spaced on 0.032 millimeter centers. In the context of printing with 150 lines per inch resolution, this spacing of sensors equates to approximately 5 sensors for each pixel of print. For purposes of clarity, the sensor 16 is shown in FIG. 2 with a symbolically smaller number of sensing elements 13.

The sensor 16 is oriented so that its axis is at an angle of 45° to the axis of the transport platen 10. For illustrative purposes, the receiver 12 is shown by solid lines in a perfectly aligned position relative to the transport platen 10. In this perfectly aligned position, an equal number of the sensor elements 13 are exposed at each end of position sensor 16 (in the case of the simplified drawing of FIG. 2 there are ten fully exposed sensors at each edge of the receiver 12). The receiver 12 is shown in an exaggerated dislocated position by a broken line 12a. In this dislocation, only nine of the sensor elements 13 are exposed beyond the leading edge of the receiver 12 while ten of the sensor elements 13 are exposed on the right-hand side of the receiver 12. This variation from the perfectly aligned position is discerned by the data conditioner 18 and is translated into correction signals to the printer controller 20 to compensate for the dislocation of the receiver 12.

Figure 3:
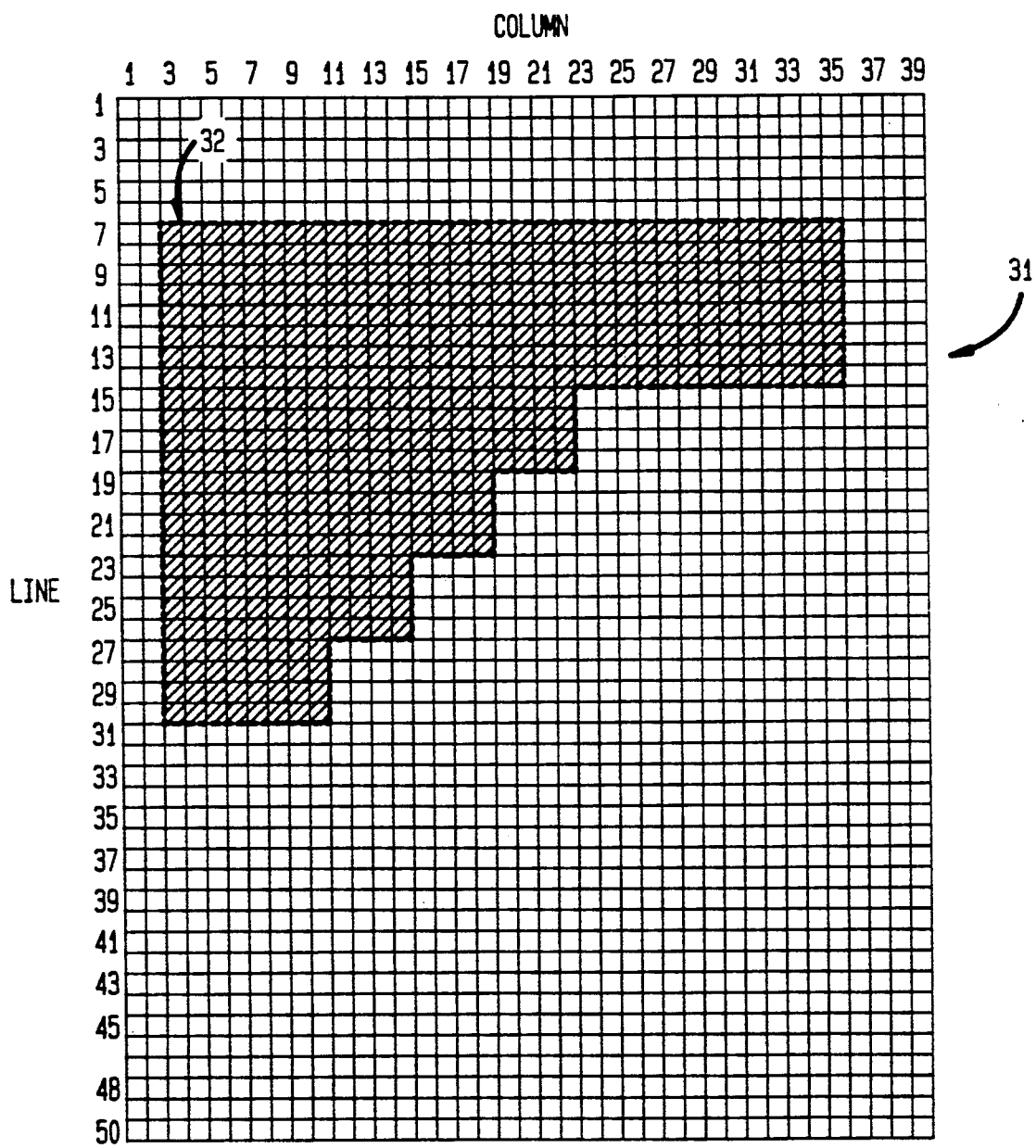
FIG. 3 is a symbolic representation of a nominal data pattern for a desired image pattern.
Figure 4:
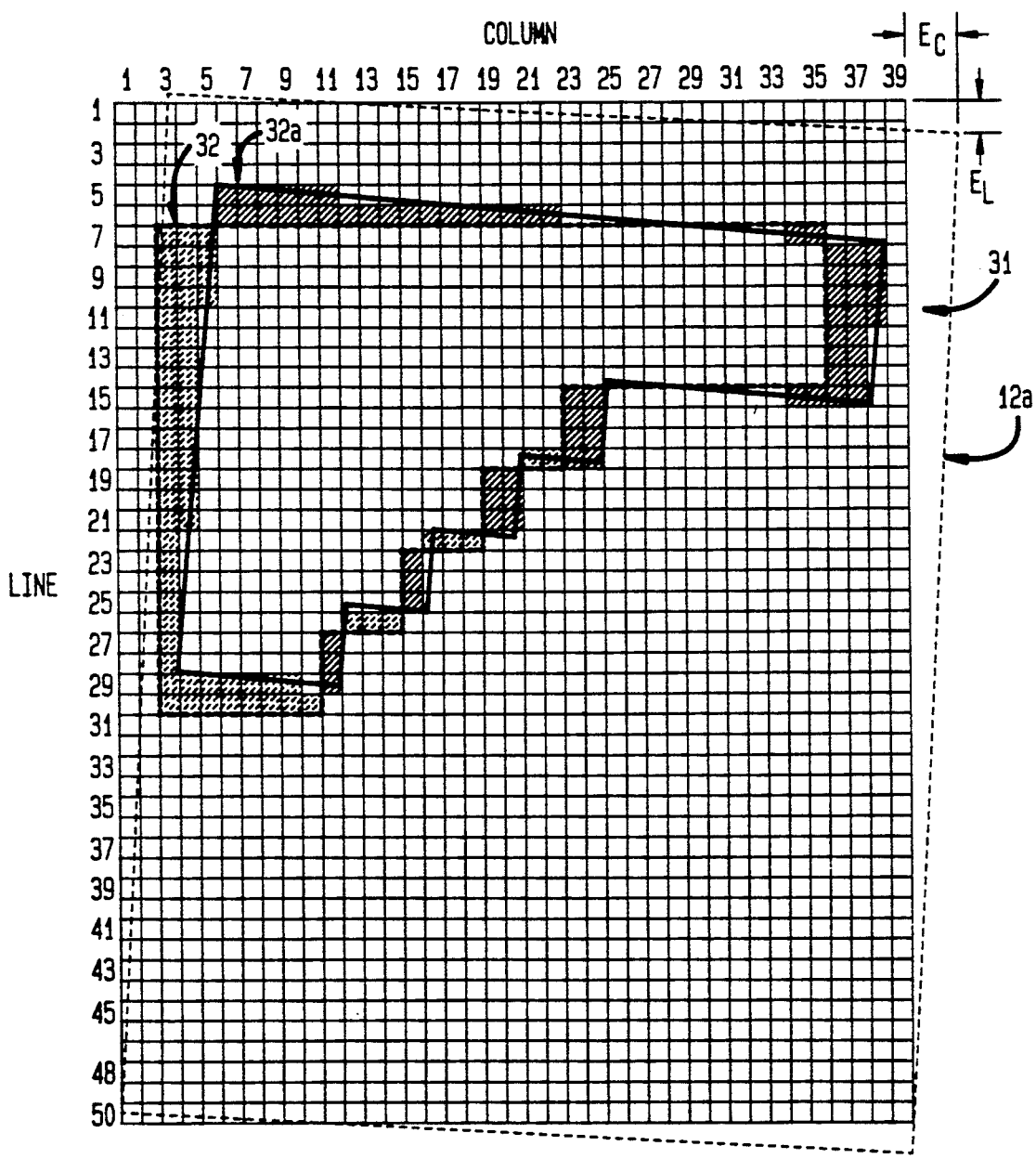
FIG. 4 is a symbolic representation of the data pattern of FIG. 3 onto which a dislocated receiver has been superimposed.

The generating of correction signals in accordance with the invention can be better understood by referring FIGS. 3 and 4.

Referring now to FIG. 3, there is shown symbolically a data field 31 comprised of columns (39 shown) and lines (50 shown). Formed on the data field 31 is a data image pattern 32 (shown as hatched lines surrounded by a perimeter of dashed lines) that is sent to the print head 8 by the printer controller 20 if the receiver 12 is located on the transport platen 10 in a preselected nominal position. In a typical thermal printer, the data is transmitted, line by line, by the printer controller 20, i.e., the first line of data is used to print a first line of image, then the printer 7 advances the receiver 12 before a second line of data is used to print a second line of image, and so on. For purposes of more clearly illustrating the invention, all of the lines of data for the image 32 ar shown simultaneously on FIG. 3. The image 32 of FIG. 3, for purposes of illustrative clarity, shows only a very small number of lines of data and a very small number of horizontal data elements. In reality there are thousands of lines of data for each image and thousands of horizontal data elements on each line. Each of the areas represented by a crossing of a column and line in FIG. 3 is symbolically representative of a "pixel" as that term is used in the art.

Referring now to FIG. 4, there is shown symbolically the data field 31 of FIG. 3 on which there is the receiver 12 is superimposed in a dislocated manner. The position of the dislocated receiver 12 is denoted with a broken line rectangle 12a. The rectangle 12a illustrates dislocations $E_L$ and $E_C$ of the receiver 12. The image 32 of FIG. 3 is shown in FIG. 4 with broken line 32. The image 32, as it should be oriented to properly align with the dislocated receiver 12 (dashed line 12a), is shown by a solid line 32a. It can be seen that in order to form the image 32 of FIG. 3 on the dislocated receiver 12 as represented by the dashed line 12a, it is necessary to move the columns and rows of certain pixels. In other words it is necessary to deposit dye on certain areas of the receiver 12 that would otherwise have been left dye free if the receiver 12 had not been dislocated. These areas are shown in FIG. 4 with solid line cross hatching. Conversely it is necessary to leave certain areas of the receiver 12 dye free that would have otherwise been dye coated if the receiver 12 had not been dislocated. These certain dye free areas are shown in FIG. 4 with dotted line cross hatching.

In order to achieve the desired image-data adjustment, the data conditioner 18 must generate correction signals for the printer controller 20. In practice, the conditioner 18 generates a set of correction signals (location-compensating signals) that correspond to the dislocation of the receiver 12 illustrated on FIG. 4.

The printer controller 20 for a typical thermal printer is provided with a large amount of processing capacity that is utilized during formation of an image to perform complex functions such as color mapping of an image. Much of the processing capacity of the printer controller 20 is available for other uses in time periods when the receiver 12 is moved between formation of successive colors of an image. Thus the functions of the data conditioner 18 can be performed by the "surplus" processing capacity of the printer controller 20 during the above mentioned time periods.

The data conditioner 18 in a preferred embodiment of the present invention is incorporated in the printer controller 20 as a software sub-routine. In operation, the software sub-routine calculates a column shift for each line of image data and a line offset for each column of image data.

Each column shift is calculated in accordance with the following equation:

Column shift for any line $n_L$ = Integer $[E_C + n_L(E_L/D)]$;

where $E_C$ is a measured displacement of the leading edge of the receiver expressed in number of columns as shown in FIG. 4;
where $E_L$ is a measured displacement of the leading edge of the receiver expressed in number of lines as shown in FIG. 4; and
where D is the distance between a center of the detector 14 and a center of the sensor 16, expressed in number of columns.

Each line offset is obtained as a line source calculated in accordance with the following equation:

Line source n for any column $n_C$ = Integer $[Line_{print} + n_C(E_L/D)]$;

where $Line_{print}$ is the line number of the line to be printed; and
where $n_C$ is the number of the column for which the calculation is being performed.

The operation of the column shift and line source formulae can be better understood when considering the following hypothetical numerical examples:

Assume that the distance D is 1500 columns, the distance $E_C$ is 1.32 columns and the distance $E_L$ is 3.16 lines. Assume also that it is desired to calculate print data for a pixel located at line 500 and column 215 on the image to be formed.

The column shift for line 500 is obtained as follows:

Column shift$_{500}$ = Integer $[1.32 + 500(3.16/1500)]$;

Column shift$_{500}$ = Integer $2.373 = 2$

Thus all incoming image data for line 500 is to be shifted 2 columns in the direction of the positional error.

The line source for column 215 at line 500 is obtained as follows:

Line Source $500_{215}$ = Integer $[500 + 215(3.16/1500)]$;

Line Source $500_{215}$ = Integer $500.45 = 500$.

Thus the data to be printed at column 215 and line 500 is selected from line 500 and column 213 of the incoming data from the computer image source 24.

Now assume that it is desired to calculate the print data for a point at line 500 and column 1200 on the image to be printed.

The column shift for line 500 remains at 2 but the line source changes as follows:

Line Source $500_{1200}$ = Integer [500 + 1200(3.16/1500)];

Line Source $500_{1200}$ = Integer 503.52 = 504.

Thus the print data to be placed on line 500 column 1200 must be taken from line 504 and column 213 of the incoming data.

As a further example, consider a case where it is desired to calculate the print data for line 1800 and column 1200.

The column shift for line 1800 is obtained as follows:

Column shift$_{1800}$ = Integer [1.32 + (1800(3.16/1500))];

Column shift$_{1800}$ = Integer 5.11 = 5.

The line source is obtained as follows:

Line Source $1800_{1200}$ = Integer [1800 + (1200(3.16/1500))].

Line Source $1800_{1200}$ = Integer 1802.52 = 1803.

Thus the print data for line 1800 column 1200 is taken from line 1803 and column 1195 of the incoming image data.

It can be observed that, in any particular column, the differential number of lines between the line source and the line$_{print}$ is constant. In the preferred embodiment, this fact is used in the software sub-routine to construct a table of line offsets for each image. The print data for each line is then calculated more simply by determining a column shift for the entire line and applying a line offset correction signal from the line offset table for each column.

In performing the calculations above it is important to round all calculated print data positions to a higher integer whenever a fractional value of 0.5 or greater is obtained. It is equally important to round fractional results of less than 0.5 to the next lower integer. This practice assures that an image is formed with errors that are, on average, no greater than one-half pixel.

The technique of generating correction signals such as those described above is particularly useful to accommodate receiver dislocations in which the edges of the dislocated receiver 12 are no longer parallel to the edges of the nominally located receiver. The technique can be greatly simplified if the dislocation of the receiver 12 is limited only to lateral displacement of the receiver either to the left or right of its nominal axis of travel. In this case, the entire image-data pattern can simply be shifted to the left or right by a number of pixels that corresponds to the amount of lateral displacement of the receiver 12.

The data correction procedure of the present invention needs buffer zones in the data field 31. It can be seen by referring back to FIG. 4 that if printing of the image 32 begins with data line 1, it is not possible to introduce the correction signals described above for the first two lines of the image 32a (lines 5 and 6). To have complete assurance that the desired correction signals can be implemented, it is necessary to print a first-color image on the receiver 12 with a buffer zone that permits a second-color and a third-color image to be positionable on the first-color image with full implementation of the correction signals. This principle of operation of the printer 7 can be best understood by referring to FIG. 5.

Figure 5:
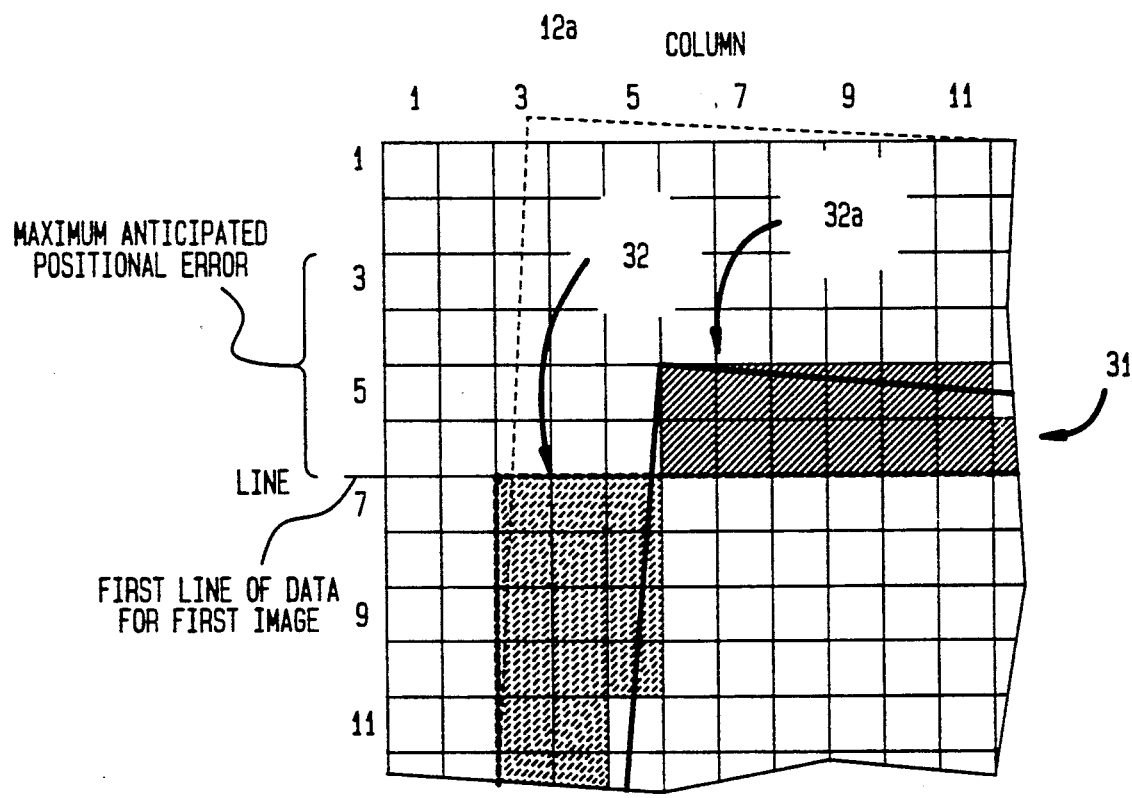
FIG. 5 is a symbolic representation of a pattern of data needed to create a buffer zone to accommodate desired image-data correction in a leading edge of the data field of FIG. 3.

Referring now to FIG. 5, there is illustrated an enlarged portion of the data field 31 and image 32 of FIG. 4. In particular, an enlarged view of the upper left hand corner of FIG. 4 is shown in FIG. 5. A maximum anticipated positional error of four lines is shown for illustrative purposes. The maximum anticipated positional error, of course, varies from one printer configuration to another. For example, in a printer for large receivers the maximum anticipated error may be 15 lines, while a printer for small receivers might have a maximum anticipated error of only 3 lines. For any one configuration of printer, a maximum anticipated positional error can be readily determined using conventional testing and statistical techniques. As can be seen in FIG. 5, six lines of data forms a sufficiently large buffer to permit a positional error correction of the maximum anticipated size in the example shown in FIG. 5, (four lines of data).

This leading edge buffer zone is created prior to printing the first color image on the receiver 12. After the leading edge of the receiver 12 has moved to the trigger sensor 14, the stepper motor 22 advances the receiver 12 a distance that corresponds to six lines of printing. Actual printing of the first color image begins only after the receiver 12 has overtraveled this six line distance. Later in the print cycle, when the second and third color images are printed, the leading edge of the receiver 12 is also moved to an overtraveled position (i.e., beyond the position-sensing location shown in FIG. 2). The overtravel for the second and third color images may be as great or less than the six line overtravel of the first color image. The actual amount of overtravel depends on how many imagedata lines are needed to compensate for a particular positional error.

Similarly, side buffer zones must be established. The technique for creating the side buffer zones is illustrated in FIG. 6.

Referring now to FIG. 6, there is illustrated an enlarged portion of the data field 31 and image 32 of FIG. 4. In particular, an enlarged portion of the upper right hand corner of FIG. 4 is shown in FIG. 6. A certain number of columns on each edge of the data field 31 (and the print head 8) must be programmed with values that result in no dye being transferred to the corresponding portions of the receiver 12 when the first color image is printed. The number of unused columns is once again a function of the maximum anticipated positional error of the receiver 12. FIG. 6, for illustrative purposes, shows a maximum anticipated positional error of four columns. This creates a four column buffer zone on each side of the data field 31. A second color image can thus be shifted laterally in order to align with a dislocated first color image. In the case illustrated in FIG. 6 the lateral shift can be as great as four columns.

It should be kept in mind that FIGS. 3 through 6 are drawn symbolically to illustrate the principles of the invention. In typical applications the lines and columns are spaced at intervals of 0.125 millimeters or less. Furthermore, in a thermal printing operation, the energization of a particular pixel position does not necessarily result in a transfer of a perfectly square element of dye onto the receiver 12. Rather, a somewhat diffused element of dye with rounded edges is transferred by any particular energized element of the print head 8. As a consequence of the small size of the transferred elements of dye and their diffused shape, the inventive technique of data adjustment results in registration of colors in an image with positional errors which are, on average, one half pixel in size. These errors are small enough to be virtually undetectable by a person viewing the image.

It is to be understood that the specific design described as an exemplary embodiment is merely illustrative of the spirit and scope of the invention. Modifications can be made in the specific design consistent with the principles of the invention. For example, although the invention has been described in terms of its primary applicability to thermal printing, it has application to other forms of printing. Additionally, even though the invention has been described in an embodiment which uses a single print head to apply successive images on a receiver, it has application to printers which use multiple print heads to apply such images.

What is claimed is:

1. Apparatus, comprising a print head and transport mechanism for transporting a receiver past the print head in a transport path, for printing at least one image on the receiver, said apparatus comprising:
   position sensing means for determining the actual position of the receiver in the transport path relative to a nominal position of the receiver in the transport path; and
   image-position adjusting means responsive to a signal from the position sensing means and coupled to the print head for generating a correction signal which contains information as to the dislocation of the determined actual position of the receiver from the nominal position such that the image is formed on the receiver on a desired portion thereof independent of the actual position of the receiver.

2. The printing apparatus of claim 1 wherein the receiver is a sheet print medium having leading and side edges and wherein the position sensing means comprises:
   a trigger sensor adapted to detect a leading edge of the receiver in the transport path, said trigger sensor being located in the transport path a fixed distance from the print head; and
   a position sensor adapted to simultaneously sense the position of the leading edge of the receiver and another edge of said receiver, said sensor being located in the transport path and adapted to operate when the trigger sensor detects the presence of the leading edge.

3. Apparatus for printing two or more overlying images on a receiver, said apparatus comprising:
   a print head adapted to print said images onto the receiver;
   transport means for transporting a receiver in a transport path past the print head each time an image is to be printed;
   position sensing means for determining the actual position of the receiver in the transport path before printing each image; and
   image-position adjusting means responsive to the determined actual positions for generating correction signals which are coupled to the print head and which facilitate the print head printing each overlying image in alignment with the first printed image on the receiver independent of the actual position of the receiver relative to the print head during the printing of the overlying image.

4. The printing apparatus of claim 3 wherein the image-position adjusting means comprises control means for comparing first and subsequent receiver positions, the first receiver position being determined by the position sensing means prior to printing a first image, and the subsequent receiver positions being actual receiver positions determined after the printing of the first image but prior to the printing of a subsequent overlying image.

5. The printing apparatus of claim 4 wherein:
   said transport means further comprises means for transporting the receiver, in a series of discrete steps, relative to the print head such that the print head creates an image on the receiver in a series of parallel lines;
   the print head comprises a plurality of elements which elements are adapted to be energized or de-energized in a series of image-line patterns in response to data which defines the image; and
   the image-position adjusting means is responsive to the determined actual positions for generating correction signals which are manifested as changes of selected portions of the image-line patterns to effect printing of selected portions of an overlying image in an advanced, retarded or laterally shifted left or right in relation to the initially printed image depending on any actual dislocation of the actual position of the receiver during printing of the overlying image.

6. The printing apparatus of claim 5 wherein the receiver is a sheet print medium having leading and side edges and wherein the position sensing means comprises:
   a trigger sensor adapted to detect a leading edge of the receiver in the transport path, said trigger sensor being located in the transport path a fixed distance from the print head; and
   a position sensor adapted to simultaneously sense the position of the leading edge of the receiver and a side edge of said receiver, said sensor being located in the transport path and adapted to operate when the trigger sensor detects the presence of the leading edge.

7. The apparatus of claim 6 wherein the printing apparatus further comprises printer controller means responsive to said trigger sensor, position sensor and image-position adjusting means and coupled to said print head for causing said print head to print a first line of a first image on the receiver only after a leading edge of the receiver has been transported a pre-set distance beyond the trigger sensor, said pre-set distance being greater than any maximum anticipated positional error of the receiver, said printer controller means being adapted to cause said print head to print a first line of an overlying image on the receiver after the leading edge of the receiver has again been transported by said transport means a determined distance beyond the trigger sensor, said determined distance being determined prior to printing each overlying image to compensate for positional errors of the receiver in the transport path which occur between the printing of the first and each overlying image thereon.

8. Apparatus for printing an image on a receiver comprising:
   a printer controller having a first input adapted to receive image information, having a second input adapted to receive position information as to the position of the receiver relative to the apparatus, and having an output;

a print head having an input coupled to the output of the printer controller and being adapted to form the image on the receiver from image information provided by the printer controller;

means for determining the actual position of the receiver in respect to an initial position of the receiver relative to the print head and for generating at an output thereof a correction signal which contains information concerning any change in actual position of the receiver relative to its initial position; and means for coupling the output of the determining and generating means to the second input of the printer controller.

9. A color printing apparatus wherein a receiver is successively advanced in a transport path to and withdrawn from a print head by a transport mechanism as successive overlying primary color images are printed on the receiver to form a full color image, said color printing apparatus comprising:

position sensing means for determining the actual position of the receiver relative to a nominal position in the transport path; and image-position adjusting means coupled to said print head and responsive to signals from the position sensing means for adjusting where the image is formed by said print head on the receiver depending on the actual position of the receiver relative to the transport path.

10. A method for printing an image onto a receiver which is transportable through a transport path across a print head comprising the steps of:

determining the actual position of the receiver to a nominal position in the print head;

comparing the determined position of the receiver to a nominal position of the transport path;

generating a correction signal which comprises information as to any dislocation in the actual position of the receiver with respect to the nominal position; and providing the correction signal to the print head such that the image generated by the print head on the receiver is oriented on a desired portion of the receiver despite any dislocation of the receiver.

11. The method of claim 10 wherein:

the print head is comprised of a plurality of linearly arrayed elements which can each be energized or de-energized in response to data which defines the image;

the print head is adapted to generate an image by creating a series of successive lines of printing on the receiver; and the step of generating a correction signal comprises the step of successively altering selected portions of lines of image data so that selected portions of said generated image are advanced, retarded, or laterally shifted left or right in position so that the image generated by the print head is oriented on the desired portion of the receiver to correct for any dislocations in the actual position of the receiver.

12. A method for printing a desired series of overlying images onto an elongated receiver having leading and side edges, which receiver is transportable across a print head, comprising the steps of:

transporting the receiver through a transport path past a position sensor and to the print head;

sensing the initial actual position of the leading and a side edge of the image receiver relative to the transport path and storing data relating to the initial position;

printing a first color image on the receiver while advancing the receiver in said transport path past the print head;

again transporting the receiver past the position sensor;

again sensing the current actual position of the leading and a side edge of the receiver relative to the transport path;

comparing the current position of the receiver with the stored data representing the initial position of the receiver;

generating a correction signal representative of the dislocations in the initial and current positions of the receiver; and providing the correction signal to the print head such that a subsequent color image printed on the receiver by the print head is aligned with the first color image printed on the receiver.

13. The method of claim 12 further comprising the steps of:

again transporting the receiver past the position sensor;

again sensing the current actual position of the leading and a side edge of the receiver relative to the transport path;

again comparing the current position of the receiver with the stored data representing the initial position of the receiver;

generating a further correction signal representative of the difference between the initial and current positions of the receiver; and providing the further correction signal to the print head such that a third color image printed on the receiver is aligned with the first color image on the receiver.

14. The method of claim 12 wherein the steps of determining and storing data representing the initial and current positions of the receiver are performed by identifying displacement of the leading and side edges of the receiver with respect to the transport path by two sensors which are fixedly spaced from each other a predetermined distance apart and with respect to said transport path to respectively intersect the leading and a side edge of the receiver.

15. The method of claim 14 wherein the printing steps comprises successively printing image lines by successive activation of print head elements arranged laterally across said transport path to effect line and column printing of image points under the control of line and column print data transmitted to the print head and wherein the step of generating a correction signal comprises the steps of:

calculating column shift for each line of the image to be printed, said column shift being equal to an integer number of columns determined in accordance with an expression, where $E_C$ is a measured displacement of the leading edge of the receiver expressed in number of columns of a data field constructed of lines and columns, where $E_L$ is a measured displacement of the leading edge of the receiver expressed in number of lines of the data field, and where D is a distance that reflects the spaced-apart distance between the two sensors expressed in number of columns of the data field;

calculating a line source for each point of the image to be printed, said line source being equal to an integer number of lines determined in accordance with the expression, where $Line_{print}$ is a line number of the line to be printed, and where $n_C$ is a number of the column for which the calculation is being performed; and combining the calculated column shifts and line sources with nominal print data being transmitted to the print head to modify the position at which the nominal data is printed on the receiver.

16. A method of using a print head to print at least one image on a receiver comprising the steps of:

transporting the receiver through a transport path past a position sensor fixedly located with respect to the print head;

determining the actual dislocation of the receiver relative to a nominal position of the receiver at the position sensor;

generating a correction signal which contains information as to the dislocation of the receiver relative to the nominal position;

coupling the correction signal to the print head; and printing an image on the receiver on a desired portion thereof independent of the actual position of the receiver.

17. A method of using a print head to print at least two images on a receiver comprising the steps of:

transporting the receiver through a transport path past a position sensor fixedly located with respect to the print head;

determining the actual position of the receiver relative to the transport path by the position sensor;

printing a first image on the receiver while moving the receiver past the print head;

again transporting the receiver through the transport path past the position sensor and to the print head;

again determining the actual position of the receiver relative to the print head by the position sensor;

generating a correction signal which contains information as to the any dislocation of the receiver reflected by the difference between the determined positions of the receiver;

providing the correction signal to the print head; and printing a second image on the receiver employing the correction signal such that the second image is aligned to the first image.

* * * * *